(12) United States Patent
Chen

(10) Patent No.: US 9,905,370 B2
(45) Date of Patent: Feb. 27, 2018

(54) ENERGY STORAGE ELECTRODES AND DEVICES

(71) Applicant: Tuqiang Chen, Albuquerque, NM (US)

(72) Inventor: Tuqiang Chen, Albuquerque, NM (US)

(*) Notice: Subject to any disclaimer, the term of this patent is extended or adjusted under 35 U.S.C. 154(b) by 85 days.

(21) Appl. No.: 14/639,654

(22) Filed: Mar. 5, 2015

(65) Prior Publication Data

US 2016/0260549 A1    Sep. 8, 2016

(51) Int. Cl.

| | |
|---|---|
| *H01G 11/30* | (2013.01) |
| *H01G 11/46* | (2013.01) |
| *H01G 11/70* | (2013.01) |
| *H01G 11/28* | (2013.01) |
| *H01G 11/32* | (2013.01) |
| *H01G 11/56* | (2013.01) |
| *H01M 4/131* | (2010.01) |
| *H01M 4/133* | (2010.01) |
| *H01M 4/525* | (2010.01) |
| *H01M 4/587* | (2010.01) |
| *H01M 4/74* | (2006.01) |
| *H01M 10/0565* | (2010.01) |
| *H01M 4/66* | (2006.01) |

(Continued)

(52) U.S. Cl.
CPC ............ *H01G 11/28* (2013.01); *H01G 11/32* (2013.01); *H01G 11/46* (2013.01); *H01G 11/56* (2013.01); *H01M 4/131* (2013.01); *H01M 4/133* (2013.01); *H01M 4/525* (2013.01); *H01M 4/587* (2013.01); *H01M 4/74* (2013.01); *H01M 10/0565* (2013.01); *H01M 4/0421* (2013.01); *H01M 4/13* (2013.01); *H01M 4/661* (2013.01); *H01M 10/0525* (2013.01); *H01M 2004/027* (2013.01); *H01M 2004/028* (2013.01)

(58) Field of Classification Search
CPC ........ H01G 11/46; H01G 11/30; H01G 11/66; H01G 11/68; H01G 11/70
USPC ........................................................ 361/502
See application file for complete search history.

(56) References Cited

U.S. PATENT DOCUMENTS

| | | | |
|---|---|---|---|
| 6,198,623 B1 * | 3/2001 | Amatucci | H01G 9/02 361/511 |
| 7,776,478 B2 * | 8/2010 | Klaassen | H01M 4/13 429/300 |

(Continued)

FOREIGN PATENT DOCUMENTS

JP        2001313237 A   * 11/2001

OTHER PUBLICATIONS

Shi et al., Low Cost and Flexible Mesh-Based Supercapacitors for Promising Large-Area Flexible/Wearable Energy Storage, Apr. 1, 2014, Nano Energy, 2014, 6, 82-91.*

(Continued)

*Primary Examiner* — Eric Thomas

(57) ABSTRACT

An energy storage electrode and a device can be fabricated from Ultrafine Metal Mesh (UMM). Deposited onto the said UMM surfaces are electrode materials including electrochemically active materials and electrolytes, producing UMM-based electrodes. Lamination of alternately stacked positive and negative UMM-based electrodes results in high performance energy storage devices including supercapacitors, Li-ion batteries, and Li metal batteries. The energy storage device shows improved energy and power characteristics resulting from the 3-D architectures of the UMM-based energy storage devices.

2 Claims, 4 Drawing Sheets

(51) Int. Cl.
  *H01M 10/0525* (2010.01)
  *H01M 4/02* (2006.01)
  *H01M 4/04* (2006.01)
  *H01M 4/13* (2010.01)

(56) References Cited

U.S. PATENT DOCUMENTS

| | | |
|---|---|---|
| 8,795,885 B2 | 8/2014 | Prieto et al. |
| 2004/0094321 A1* | 5/2004 | Nakamura ............. H01G 9/012 174/521 |
| 2011/0111283 A1 | 5/2011 | Rust et al. |
| 2011/0204020 A1* | 8/2011 | Ray ....................... B82Y 25/00 216/13 |
| 2013/0217289 A1* | 8/2013 | Nayfeh .................. H01G 11/30 442/301 |
| 2014/0340818 A1* | 11/2014 | Xie ....................... H01G 11/30 361/502 |

OTHER PUBLICATIONS

Long, et al., "Three dimensional battery architectures", Chem. Rev., 2004, 104, 4463-4492.

* cited by examiner

ENERGY STORAGE ELECTRODES AND DEVICES

STATEMENT REGARDING FEDERALLY SPONSORED R&D

The invention was made with Government support under contract No. NNX14CC46P awarded by the US National Aeronautics and Space Administrations. The Government has certain rights in the invention.

FIELD OF INVENTION

The invention relates to the field of energy storage electrodes and devices, and primarily of supercapacitors, Li-ion batteries, and Li metal batteries fabricated from non-traditional energy storage device processing techniques. More specifically, the invention relates to an electrode assembly for an energy storage device, notably a supercapacitor, a Li-ion battery, or a Li metal battery, the structures of which are defined so as to optimize performance of the energy storage system.

BACKGROUND OF THE INVENTION

Traditional batteries or supercapacitors are typically two-dimensional (2-D) cells, where thick films of the anode, separator/electrolyte, and cathode are stacked, spiral wound, or folded. The electrodes (anodes and cathodes) of supercapacitors, Li metal or Li-ion cells are of similar form and are made by similar processes on similar or identical equipment where active electrode materials in the form of powder are mixed with conductive binder to form a slurry, which is coated on metallic foils that act as the current collectors conducting the current in and out of the cell. The electrodes are dried, slit, and assembled into 2-D cells. To maximize power density, films of electrode, electrolyte and current collector are kept as thin as possible to achieve smallest distance for ion transport. However, these electrode materials have a particle size normally larger than 10 microns and it is not practical to prepare electrode films thinner than several tens of microns. In addition, to maintain sufficient electrochemical stability and mechanical integrity necessary for cell fabrication, the thickness of inactive component including current collector and electrolyte separator is typically limited to 25 microns. For balanced power and energy performance, electrode thickness is typically set to 100 microns. There is therefore no additional room for improving electrochemical performance characteristics by reducing film thickness of electrodes, electrolytes and current collectors.

In recent years there has been the realization that unproved battery performance can be achieved by reconfiguring the electrode materials that currently employed in 2-D batteries into 3-D architectures. The 3-D configurations generally include large number of micron- or nano-sized cathodes and anodes separated with or distributed in the matrix of a solid electrolyte domain. One example of the 3-D microbatteries was illustrated in a review article (Long et al, Chem. Rev. 2004, 104, 4463-4492), where arrays or rows of interdigitated cylindrical cathodes and anodes are attached at their bases to flat sheets serving as current collectors. Another example of 3-D microbattery was illustrated in a US patent (U.S. Pat. No. 8,795,885 B2) where an anode including an array of nanowires electrochemically coated with a polymer electrolyte, and surrounded by a cathode matrix. The general features of the 3-D configuration ensure short ion transport distances within and between cathodes and anodes and may permit use of smaller amounts of inactive materials including current collectors and separators. Consequently, energy storage devices with appropriate 3-D structures possess performance characteristics of high power density and high energy density along with other desirable characteristics including long cycle and shelf life and excellent safety that are not seen in traditional 2-D configurations.

However, the development of 3-D technologies for energy storage devices is inherently limited by the complexity of micro fabrications involving varieties of special battery and supercapacitor materials. It is therefore extremely challenging to fabricate 3-D energy devices and no operational 3-D energy devices have been reported. In addition, these micro fabrication techniques, developed for fabrication of micro-sized devices, are not best suited to fabrication of regular sized devices including batteries and supercapacitors for mobile and portable electronic applications.

SUMMARY OF THE INVENTION

UMM is defined herein as Ultrafine Metal Mesh.

These and other objectives are achieved in the present invention by utilizing 1) an ultrafine metal mesh (UMM) based energy storage electrode comprising of the UMM sequentially coated with an electrode material film and an electrolyte film, and 2) an energy storage device, primarily a supercapacitor and a Li-ion or Li metal battery, comprising of at least one UMM anode and one UMM cathode that are tightly bonded together by means of chemical, physical or thermal methods.

To ensure 3-D architectures of the UMM based energy storage device, the dimensions of the UMM (wire diameter and opening) and the electrode/electrolyte films have to be reasonably small, preferably in the nano or submicron scale, and the electrode and electrolyte films have to be coated on the surface of the mesh wires as shown in FIG. 3.

Accordingly, it is an object of the present invention to provide UMM energy storage electrodes and a method of manufacturing them. Another object of the invention is to provide 3-D energy storage devices of small or large size with high power density, high energy density, good cycleability, and satisfactory safety and a method of manufacturing them.

In accordance with the present invention, a method for making an energy storage electrode comprises the steps of depositing thin films of an electrode (either anode or cathode) material onto the surface of UMM wires and subsequent depositing thin films of a solid electrolyte onto the electrode films, and additionally a method for assembling the electrodes into an energy storage device, primarily a supercapacitor, a Li-ion battery, and a Li metal battery, wherein multiple UMM anodes and UMM cathodes are alternately stacked and laminated together using the electrolyte as adhesive. The energy storage devices may also be produced by winding of an anode and a cathode followed by adhesion of the electrolyte. This UMM-based energy storage device has numerous anodes and cathodes in the form of coated mesh wires in each of the mesh layers distributed in the continuous phase of the electrolyte.

UMMs with micron or submicron thickness of various sizes are readily fabricated by direct metal wire weaving, electroforming, or photo-lithography techniques. These UMMs can be readily managed and processed. Therefore, another embodiment of the present invention is the feasibility of depositing thin films of various battery or supercapacitor electrode and electrolyte materials onto the surface of the UMMs by traditional wet physical or chemical, vapor, and electrochemical methods, forming UMM anodes or cathodes. Lamination of the UMM electrodes, produces a 3-D energy storage device (battery or supercapacitor) of desired size and capacity.

BRIEF DESCRIPTION OF THE DRAWINGS

The principle of the present invention may be understood with reference to the detailed description, in conjunction with the accompanying drawings, in which.

DETAILED DESCRIPTION OF THE INVENTION

Figure 1:
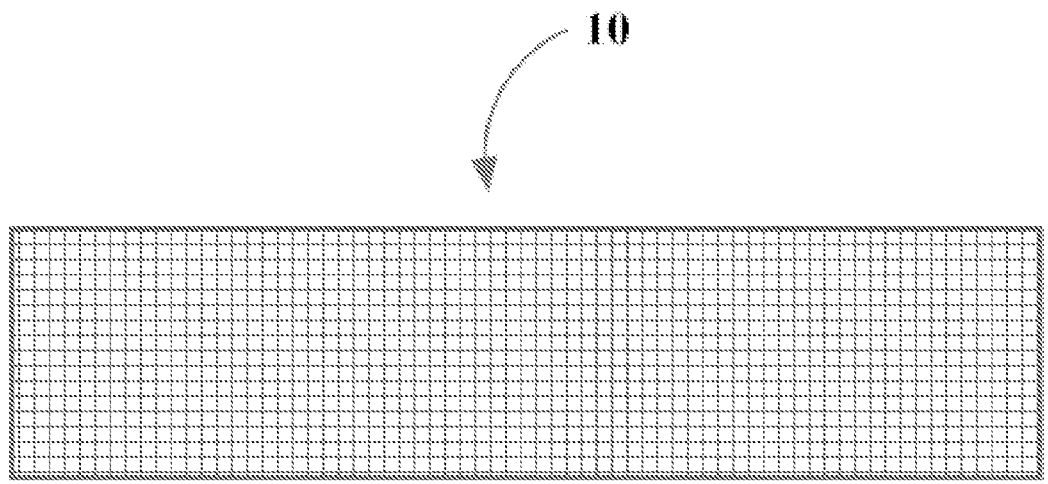
FIG. 1 shows a plan view of an ultrafine metal mesh (UMM) substrate.

The present invention includes an energy storage electrode and a device, primarily a supercapacitor, a Li-ion battery, or a Li battery, having a positive and a negative electrode comprising an array of ultrafine metal meshes coated with an electrode material and a solid-state electrolyte, wherein the positive and negative electrode coated meshes are stacked alternately and closely bonded with the electrolytes, thereby forming interpenetrating electrodes, and a method for producing such energy storage devices. The present energy storage architecture increases energy storage device kinetics by reducing charge (ions or electrons) diffusion length between and within the positive and negative electrodes, and allows facile fabrication of small or large energy storage devices having long lifetime and rapid discharge capacity.

In accordance with embodiments of the present invention, an ultrafine metal mesh having dimensions (for example, mesh wire diameter and opening) ranging from nanometers to microns is utilized as a current collector, upon which an electrode material and a solid electrolyte are sequentially deposited by means of wet chemical or electrochemical deposition, and chemical or physical vapor deposition.

Supercapacitors, also called ultracapacitors or electrochemical double layer capacitors, as an energy storage device, use high surface area carbon as electrode materials such as activated carbon, carbon nanotubes, graphenes, as well as pseudo-capacitance metal oxides including $RuO_2$, $NiO$, and $IrO_2$. Such materials may be deposited on the surface of the mesh wire in a number of ways. In particular, a sol-gel method, in combination with a spin-coating process, to be described hereinbelow, permits uniform deposition of graphene-metal oxide nanocomposite onto the surface of mesh wire.

A polymer or ceramic electrolyte may be deposited on top of the supercapacitor electrode coatings. Again, the electrolyte may be deposited in a number of ways; a solution method in combination with the spin-coating process, to be described hereinbelow, permits uniform deposition of a proton-conducting polymer electrolyte and an ammonium borate conducting polymer electrolyte.

Li-ion batteries, as an energy storage device, commonly use a metal oxide as cathode and a carbon material as anode. Any suitable Li-ion battery cathode material may be used with $LiCoO_2$, $LiNiO_2$, or a metal phosphate, as an example. Such materials may be deposited on the surface of the mesh wire in a number of ways. A sol-gel method, in combination with a spin-coating process, to be described hereinbelow, permits uniform deposition of $LiCoO_2$ onto the surface of mesh wire. Any suitable Li-ion anode material may be used in the invention, with graphite, or Si as an example. Such materials may be deposited on the surface of the mesh wire in a number of ways. A solution method, in combination with a spin-coating process, to be described hereinbelow, permits uniform deposition of graphite onto the surface of mesh wire.

A polymer or ceramic electrolyte may be deposited on top of the Li-ion cathode or anode electrode coatings. Again, the electrolyte may be deposited in a number of ways; a solution method in combination with the spin-coating process, to be described hereinbelow, permits uniform deposition of a Li-conducting polymer electrolyte.

One embodiment of the present method utilizes spin-coating technique on metal mesh that is suspended above the spin-coater. The spin-coater may allow the suspended mesh to spin or rotate along the z axis (perpendicular to the mesh plane) or the x and y axis (in the mesh plane), permitting uniform coating on mesh wire. In addition, subsequent thermal treatments may be needed under appropriate conditions for optimal material compositions, structures, and morphologies.

Another embodiment of the method employs assembly of the mesh-based electrodes into energy storage devices by alternately stacking of positive and negative electrodes followed by lamination to ensure conformal bonding between electrodes.

The stacking patterns of positive and negative UMM electrodes may be arranged for most facile charge transport between the electrodes. During the lamination process, the polymer or pre-cured ceramic electrolytes may be amenable at an elevated temperature to allow better contact between electrolyte films and to fill the voids of the coated mesh openings to form continuous electrolyte phase throughout the electrode wires for facile charge transfer between positive and negative electrodes.

Figure 2:
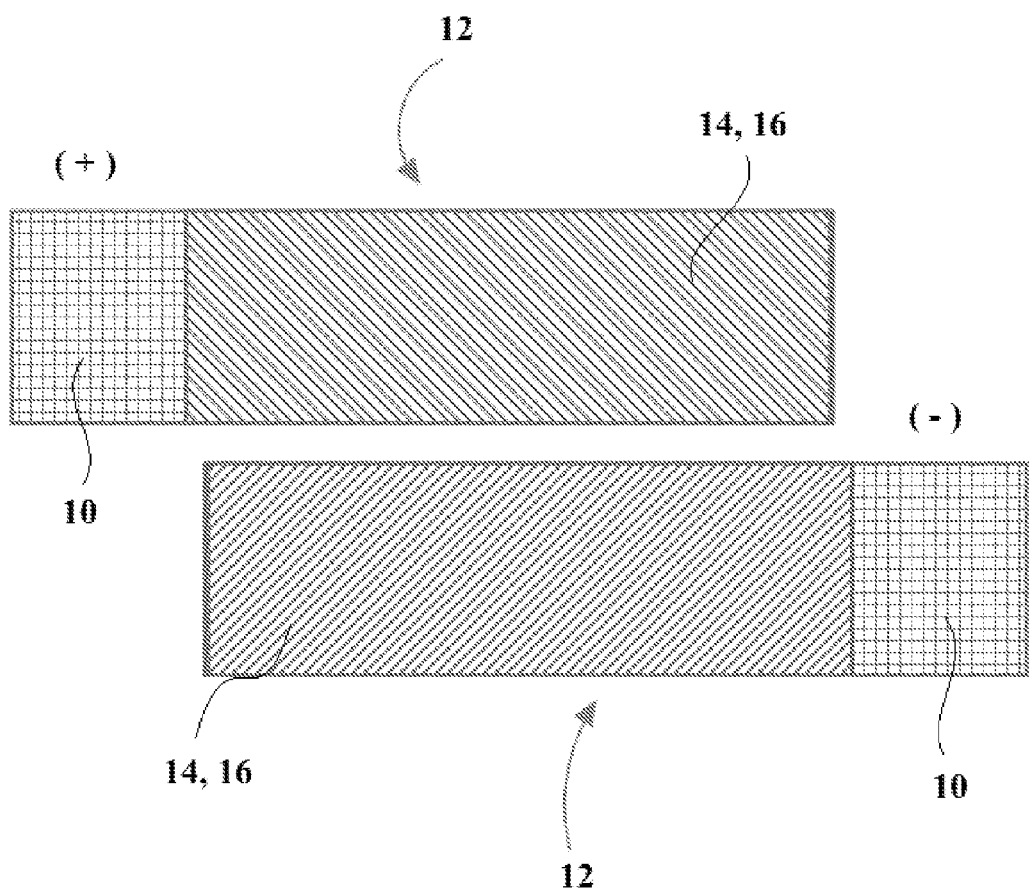
FIG. 2 shows a plan view of a pair of UMM electrodes.
Figure 3:
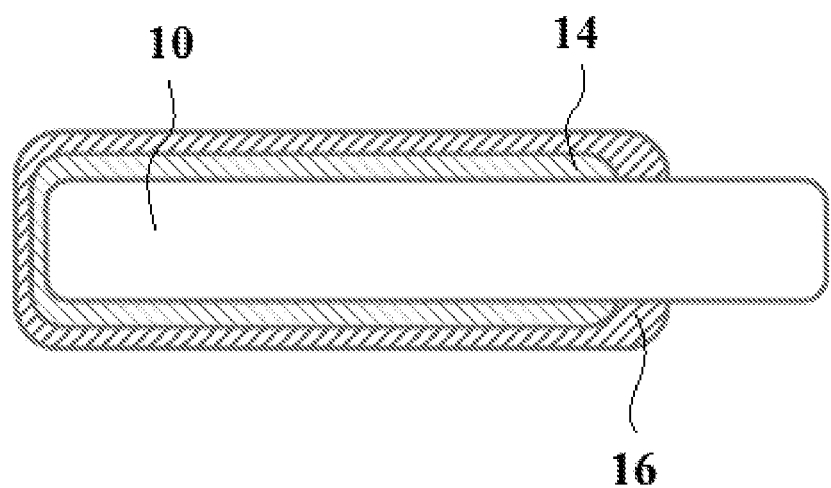
FIG. 3 shows a cross-sectional view of coatings of electrode material film and electrolyte film on a mesh wire.
Figure 4:
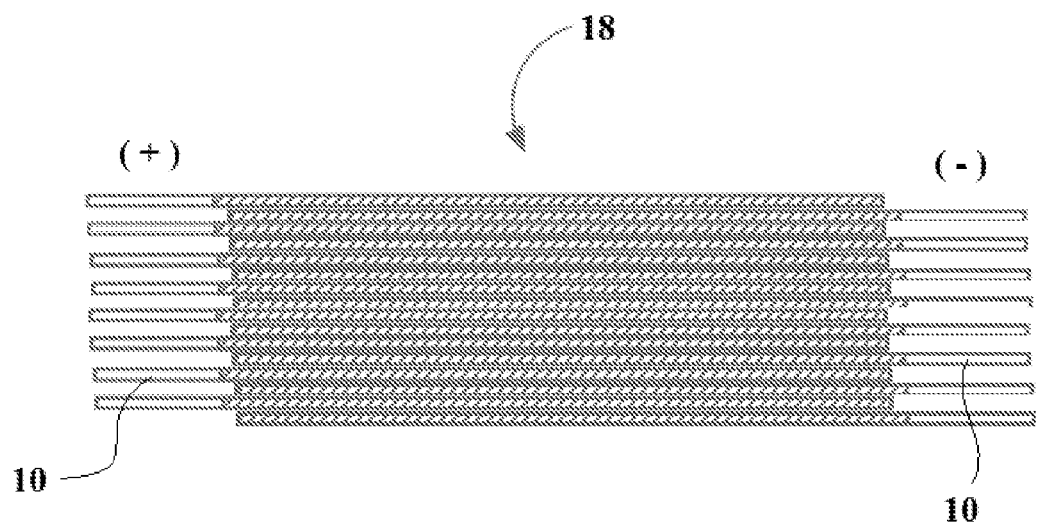
FIG. 4 illustrates a plan side view of the assembly of UMM electrodes into energy storage device by alternately stacking of UMM positive and negative electrodes followed by lamination.

Reference is now made to the present embodiments of the invention, examples of which are illustrated in the accompanying drawings. FIGS. 1-4 illustrate the preparation and structures of the metal mesh electrodes and energy storage device. A plan view of an ultrafine metal mesh substrate, 10, is shown in FIG. 1; a plan view of a pair of metal mesh electrodes, 12, is shown in FIG. 2, with the electrode material film, 14, and electrolyte film, 16, that are further illustrated in the cross-sectional view of a coated mesh wire in FIG. 3. FIG. 4 illustrates the alternately stacking and lamination of positive and negative electrodes, forming an energy storage device, 18.

Having generally described the invention, the following examples serve to illustrate the preferred embodiments of the present invention and should not be construed as limiting the scope of the invention:

EXAMPLE 1

Supercapacitor Electrode Preparation

A Ni mesh ($3\times6$ cm$^2$, opening 2 microns, wire diameter 2 microns) was cleaned by soaking and sonicating in 50% isopropyl alcohol (IPA) for 16 hrs, and dried in an oven at 120° C. for 1 hr. The mesh sample was clamped with four Al spacer bars (0.5 cm×0.5 cm×5 cm) at the two ends of the rectangular mesh and suspended on top of an Al plate (5×5 cm$^2$) using 4 small screws at each of the four corners of the square Al plate. The suspended mesh on Al plate was placed on a spin coater.

A supercapacitor electrode precursor solution was prepared by slow addition of 5 wt % of $RuCl_3$ in IPA to an aqueous graphene oxide solution (4 wt %, Sigma-Aldrich). The solution was diluted with IPA to allow approximately 1:1 water to IPA ratio by weight. The $RuCl_3$ to graphene oxide ratio may vary from 0 wt % to 10 wt %.

The precursor solution was added onto the surface of the mesh that was suspended on top of the Al plate and placed on a spin-coater. The precursor solution was allowed to condition for 30 seconds, permitting complete wetting on both sides of the mesh, followed by spin at 1200 rpm for 20 seconds. The coating was dried in air at 160° C. for 16 hrs first followed by heating at 200-400° C. in $N_2$ for 6 hrs, forming thin films of $RuO_2$-Graphene nanocomposite. Scanning Electron Microscope (SEM) study revealed uniform coating with thickness of ~1 micron.

The mesh coated with electrode material was further coated with a polymer electrolyte, including a proton-conducting polymer and an ammonium ion conducting polymer. The preparation and processing of the polymer films were described as follows:

A. $TEABF_4$-PEO Polymer Electrolyte Films:

A solution of $TEABF_4$ (tetraethylammonium tetrafluoroborate)-PEO (polyethylene oxide) in AN (acetonitrile) was first prepared by dissolving 0.5 wt % of $TEABF_4$ (Aldrich) and 5 wt % of PEO (Aldrich) in AN. Under dry atmosphere, a small portion of the polymer solution was added on the surface of the nanocomposite coating on the Ni mesh and conditioned for 30 seconds, permitting complete wetting on both sides of the coated mesh, followed by spin at 1200 rpm for 20 seconds. The coating was dried under $N_2$ at 120° C. for 2 hrs. Subsequent SEM study revealed uniform coating with a thickness of ~1 micron.

B. $H_3PO_4$-PVA Polymer Electrolyte Films:

A solution of $H_3PO_4$-PVA (polyvinyl alcohol) was prepared by dissolving 5 wt % of PVA (average $M_w$ 130,000, 99+ % hydrolyzed) and 5 wt % of $H_3PO_4$ in deionized (DI) water at 65° C. with vigorous stirring. The solution was cooled to room temperature for subsequent coating study. A small portion of the polymer solution was added on the surface of the nanocomposite coating on the Ni mesh and conditioned for 30 seconds, permitting complete wetting on both sides of the coated mesh, followed by spin at 1200 rpm for 20 seconds. The coating was dried in air at 100° C. for 1 hrs. Subsequent SEM study revealed uniform coating over the electrode layer with a thickness of ~1 micron.

EXAMPLE 2

Li-Ion Anode Preparation

A Cu mesh (3×6 cm$^2$, opening 2 microns, wire diameter 2 microns) was cleaned by soaking and sonicating in 50% isopropyl alcohol (IPA) for 16 hrs, and dried in an oven at 120° C. for 1 hr. The mesh sample was clamped with four Al spacer bars (0.5 cm×0.5 cm×5 cm) at the two ends of the rectangular mesh and suspended on top of an Al plate (5×5 cm$^2$) using 4 small screws at each of the four corners of the square Al plate. The suspended mesh on Al plate was placed on a spin coater.

The supercapacitor electrode precursor solution described in EXAMPLE 1 with 0 wt % $RuCl_3$ concentration was used as the Li-ion anode precursor solution. Again, the precursor solution was added onto the surface of the mesh that was suspended on top of the Al plate and placed on a spin-coater. The precursor solution was allowed to conditioning for 30 seconds, permitting complete wetting on both sides of the mesh, followed by spin at 1200 rpm for 20 seconds. The coating was dried in $N_2$ at 160° C. for 16 hrs first followed by heating at 500-850° C. in $N_2$ for 6 hrs, forming thin films of carbon graphite. Scanning Electron Microscope (SEM) study revealed uniform coating with thickness of ~1 micron.

The mesh coated with graphite was further coated with a polymer electrolyte. The preparation and processing of the polymer films were described as follows:

The polymer electrolyte solution was prepared by dissolving 0.5 wt % $LiPF_6$ and 5 wt % PEO ($M_n$~2,000,000, Aldrich) in AN. A small portion of the polymer solution was added on the surface of the graphite coating on the Cu mesh and conditioned for 30 seconds, permitting complete wetting on both sides of the coated mesh, followed by spin at 1200 rpm for 20 seconds. The coating was dried in $N_2$ at 80° C. for 1 hrs and stored under dry atmosphere. Subsequent SEM study revealed uniform coating over the graphite layer with a thickness of ~1 micron.

EXAMPLE 3

Li-Ion Cathode Preparation

A Ni mesh was cleaned, suspended and placed on a spin coater as described in EXAMPLE 1 and ready for subsequent spin-coating. A $LiCoO_2$ precursor solution was prepared as follow: A solution of lithium acetate, $(Li(CH_3COO))_2 \cdot 2H_2O$, 5.10 g, 0.05 mol, in 50 mL 50%) was mixed with a solution of cobalt acetate, $(Co(CH_3COO)_2 \cdot 4H_2O$, 12.55 g, 0.05 mol in 50 mL 50% IPA) and poly(ethylene glycol) (8.80 g, 0.2 mol) in a 250-mL flask at room temperature. The resulting pink-colored solution was heated under reflux for 6 hrs and cooled to room temperature ready for subsequent spin-coating.

The precursor solution was added onto the surface of the mesh that was suspended on top of the Al plate and placed on a spin-coater. The precursor solution was allowed to conditioning for 30 seconds, permitting complete wetting on both sides of the mesh, followed by spin at 1200 rpm for 20 seconds. The coating was dried in air at 160° C. for 16 hrs first followed by heating at 400° C. in air for 4 hrs and 850° C. in $N_2$ for 8 hrs, forming thin films of $LiCoO_2$. X-ray diffraction (XRD) confirmed formation of crystalline $LiCoO_2$ and SEM study revealed uniform coating with a thickness of ~1 micron.

The Ni mesh coated with $LiCoO_2$ was further coated with a polymer electrolyte. The preparation and processing of the polymer films were described as follows:

The polymer electrolyte solution was prepared by dissolving 0.5 wt % $LiPF_6$ and 5 wt % PEO ($M_n$~2,000,000, Aldrich) in AN. A small portion of the polymer solution was added on the surface of the $LiCoO_2$ coating on the Ni mesh and conditioned for 30 seconds, permitting complete wetting on both sides of the coated mesh, followed by spin at 1200 rpm for 20 seconds. The coating was dried in $N_2$ at 80° C. for 1 hrs and stored under dry atmosphere. Subsequent SEM study revealed uniform PEO electrolyte coating over the $LiCoO_2$ layer with a thickness of ~1 micron.

EXAMPLE 4

Assembly of Energy Storage Devices

UMM electrodes were cut into a rectangular sheet of 2 cm×3 cm as shown in FIG. 2. UMM anodes and cathodes were stacked alternately as shown in FIG. 4. The electrode assemblies were laminated in dry atmosphere to bond the electrodes into an energy storage device. The laminated electrodes are attached with metal foil tabs and are sealed in a pouch with the tabs outside the pouch. The lamination conditions are dependent on the type and thickness of the electrolyte and a number of examples are given here: A) for supercapacitors with $TEABF_4$-PEO Polymer Electrolyte: 85° C., 20 psig, and 80 min, B) for supercapacitors with $TEABF_4$-PEO Polymer Electrolyte: 120° C., 25 psig, and 60 min, C) for Li-ion cells with $LiPF_6$-PEO electrolyte: 85° C., 25 psig, and 80 min.

What is claimed:

1. An energy storage device comprising: a plurality of a supercapacitor electrode, alternately stacked and laminated as supercapacitor negative and positive electrodes, wherein said supercapacitor electrode comprising:
   a) an ultrafine metal mesh (UMM) comprising a material selected from the group consisting of Al, Cu, Ni, Sb, Cr, Fe, and Si, wherein said mesh wire diameter, is ranged from 20 nanometers to less than 20 microns, and mesh opening ranged from 20 nanometers to less than 20 microns;
   b) a thin cylindrical layer of active electrode material deposited on said UMM wires, wherein said electrode material comprising a nanocomposite material selected from the group consisting of graphene-$RuO_2$, graphene-NiO, and graphene-$IrO_2$, and the thickness of said thin layer of active material, is ranged from 8 nanometers to 8 microns; and
   c) a thin cylindrical layer of electrolyte deposited on said electrode material layer, wherein said electrolyte comprising of a material selected from the group consisting of a polymer electrolyte, a gel polymer electrolyte, and a ceramic electrolyte, and the thickness of said electrolyte layer is ranged from 5 nanometers to 5 microns.

2. An energy storage device comprising: a plurality of a Li-ion anode and a Li-ion cathode, alternately stacked and laminated, wherein said anode comprising:
   a) an ultrafine metal mesh (UMM) comprising a material selected from the group consisting of Al, Cu, Ni, Sb, Cr, Fe, and Si, wherein said mesh wire diameter, is ranged from 20 nanometers to less than 20 microns, and mesh opening ranged from 20 nanometers to less than 20 microns;
   b) a thin cylindrical layer of active anode material deposited on said UMNI wires, wherein said anode material comprising a material selected from the group consisting of graphite and silicon, and the thickness of said anode material layer is ranged from 8 nanometers to 8 microns; and
   c) a thin cylindrical layer of electrolyte deposited on said anode material layer, wherein said electrolyte comprising of a material selected from the group consisting of a polymer electrolyte, a gel polymer electrolyte, and a ceramic electrolyte, and the thickness of said electrolyte layer is ranged from 5 nanometers to 5 microns;
   and wherein said cathode comprising:
   a) an ultrafine metal mesh (UMNI) comprising a material selected from the group consisting of Al, Cu, Ni, Sb, Cr, Fe, and Si, wherein said mesh wire diameter, is ranged from 20 nanometers to less than 20 microns, and mesh opening ranged from 20 nanometers to less than 20 microns;
   b) a thin cylindrical layer of active cathode material deposited on said UMNI wires, wherein said cathode material comprising a material selected from the group consisting of $LiCoO_2$, $LiNiO_2$, $LiFePO_4$ and $V_2O_5$ and the thickness of said cathode material layer is ranged from 8 nanometers to 8 microns; and
   c) a thin cylindrical layer of electrolyte deposited on said cathode material layer, wherein said electrolyte comprising of a material selected from the group consisting of a polymer electrolyte, a gel polymer electrolyte, and a ceramic electrolyte, and the thickness of said electrolyte layer is ranged from 5 nanometers to 5 microns.

* * * * *